(12) United States Patent
Raghunathan et al.

(10) Patent No.: US 9,971,664 B2
(45) Date of Patent: May 15, 2018

(54) DISASTER RECOVERY PROTECTION BASED ON RESOURCE CONSUMPTION PATTERNS

(71) Applicant: VMware, Inc., Palo Alto, CA (US)

(72) Inventors: Amarnath Raghunathan, Campbell, CA (US); Yanislav Genkov Yankov, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 123 days.

(21) Appl. No.: 14/837,708

(22) Filed: Aug. 27, 2015

(65) Prior Publication Data

US 2017/0060608 A1 Mar. 2, 2017

(51) Int. Cl.
*G06F 9/455* (2006.01)
*G06F 11/30* (2006.01)

(52) U.S. Cl.
CPC .......... *G06F 11/30* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,533,229 B1 * | 5/2009 | Van Rietschote | ... | G06F 11/1438 711/161 |
| 8,286,174 B1 * | 10/2012 | Schmidt | ... | G06F 9/5077 709/226 |
| 9,104,607 B2 * | 8/2015 | Bartholomy | ... | G06F 11/14 |
| 9,274,903 B1 * | 3/2016 | Garlapati | ... | G06F 11/2002 |
| 9,336,103 B1 * | 5/2016 | Hasbe | ... | G06F 11/2023 |
| 9,454,549 B1 * | 9/2016 | Bachu | ... | G06F 17/30212 |
| 9,477,555 B1 * | 10/2016 | Hagan | ... | G06F 11/1464 |
| 9,477,556 B2 * | 10/2016 | Deng | ... | G06F 11/1451 |
| 9,477,693 B1 * | 10/2016 | Bachu | ... | G06F 11/14 |
| 9,846,590 B2 * | 12/2017 | Chen | ... | G06F 9/45533 |
| 2009/0144393 A1 * | 6/2009 | Kudo | ... | G06F 9/5044 709/218 |
| 2009/0172461 A1 * | 7/2009 | Bobak | ... | G06F 11/0709 714/2 |
| 2009/0300409 A1 * | 12/2009 | Bates | ... | G06F 11/008 714/5.1 |

(Continued)

OTHER PUBLICATIONS

VMware White Paper; "Making Your Business Disaster Ready with Virtual Infrastructure"; Copy rights 2006; (vmware_2006.pdf; pp. 1-17).*

(Continued)

*Primary Examiner* — Hiren Patel

(57) ABSTRACT

Assessing the need for disaster recovery (DR) protection for a virtual application may include accessing resource consumption history for constituent VMs that support the virtual application. The resource consumption history may include usage metrics corresponding to resources used by each VM. A change in a cost of downtime of the given virtual application may be produced and used to assess criteria or rules. The given virtual application may be designated for DR protection based on an assessment of the criteria. DR protection may be activated for the designated virtual applications. The DR protection may automatically expire after a period of time.

19 Claims, 8 Drawing Sheets

(56) References Cited

U.S. PATENT DOCUMENTS

| | | | | |
|---|---|---|---|---|
| 2010/0199285 A1* | 8/2010 | Medovich | G06F 9/45533 | 718/104 |
| 2011/0022879 A1* | 1/2011 | Chavda | G06F 11/0793 | 714/1 |
| 2011/0258481 A1* | 10/2011 | Kern | G06F 11/1484 | 714/4.1 |
| 2012/0102504 A1* | 4/2012 | Iyer | G06Q 10/00 | 719/318 |
| 2012/0117422 A1* | 5/2012 | Radhakrishnan | G06F 11/0709 | 714/15 |
| 2012/0136833 A1* | 5/2012 | Bartholomy | G06F 11/2028 | 707/644 |
| 2012/0284408 A1* | 11/2012 | Dutta | G06F 9/5066 | 709/226 |
| 2012/0290865 A1* | 11/2012 | Kansal | G06F 1/3203 | 713/340 |
| 2013/0042234 A1* | 2/2013 | DeLuca | G06F 9/45558 | 718/1 |
| 2013/0080823 A1* | 3/2013 | Roth | G06F 11/2023 | 714/4.1 |
| 2013/0185717 A1* | 7/2013 | Lakshminarayanan | G06F 9/45558 | 718/1 |
| 2013/0198384 A1* | 8/2013 | Kirsch, II | G06F 15/161 | 709/226 |
| 2013/0262390 A1* | 10/2013 | Kumarasamy | H04L 41/08 | 707/649 |
| 2013/0297964 A1* | 11/2013 | Hegdal | G06F 11/0712 | 714/2 |
| 2014/0137104 A1* | 5/2014 | Nelson | G06F 9/45558 | 718/1 |
| 2014/0282503 A1* | 9/2014 | Gmach | H04L 41/0823 | 718/1 |
| 2014/0289205 A1* | 9/2014 | Shigeta | H04L 47/2475 | 707/660 |
| 2015/0127970 A1* | 5/2015 | Bivens | G06F 11/2007 | 714/4.11 |
| 2015/0134723 A1* | 5/2015 | Kansal | H04L 67/1031 | 709/203 |
| 2015/0153959 A1* | 6/2015 | Esaka | G06F 3/0619 | 711/114 |
| 2015/0295791 A1* | 10/2015 | Cropper | G06F 9/45558 | 709/226 |
| 2015/0302326 A1* | 10/2015 | Kakade | G06Q 10/00 | 705/7.28 |
| 2015/0347242 A1* | 12/2015 | Martos | G06F 11/1469 | 714/19 |
| 2015/0363283 A1* | 12/2015 | Malnati | G06F 11/2035 | 714/12 |
| 2015/0378786 A1* | 12/2015 | Suparna | G06F 9/5011 | 718/104 |
| 2016/0048408 A1* | 2/2016 | Madhu | G06F 11/1458 | 718/1 |
| 2016/0196320 A1* | 7/2016 | Borowiec | G06F 17/30153 | 707/624 |
| 2016/0283281 A1* | 9/2016 | Antony | G06F 9/5055 | |
| 2016/0283513 A1* | 9/2016 | Antony | G06F 8/61 | |
| 2017/0005987 A1* | 1/2017 | Masurekar | G06F 17/30557 | |

OTHER PUBLICATIONS

Neerja Rewal; "Architecting a disaster recovery plan for multitier web applications using Microsoft Azure Site Recovery"; Nov. 21, 2014; (Rewal_Nov2014.pdf; pp. 1-15).*

* cited by examiner

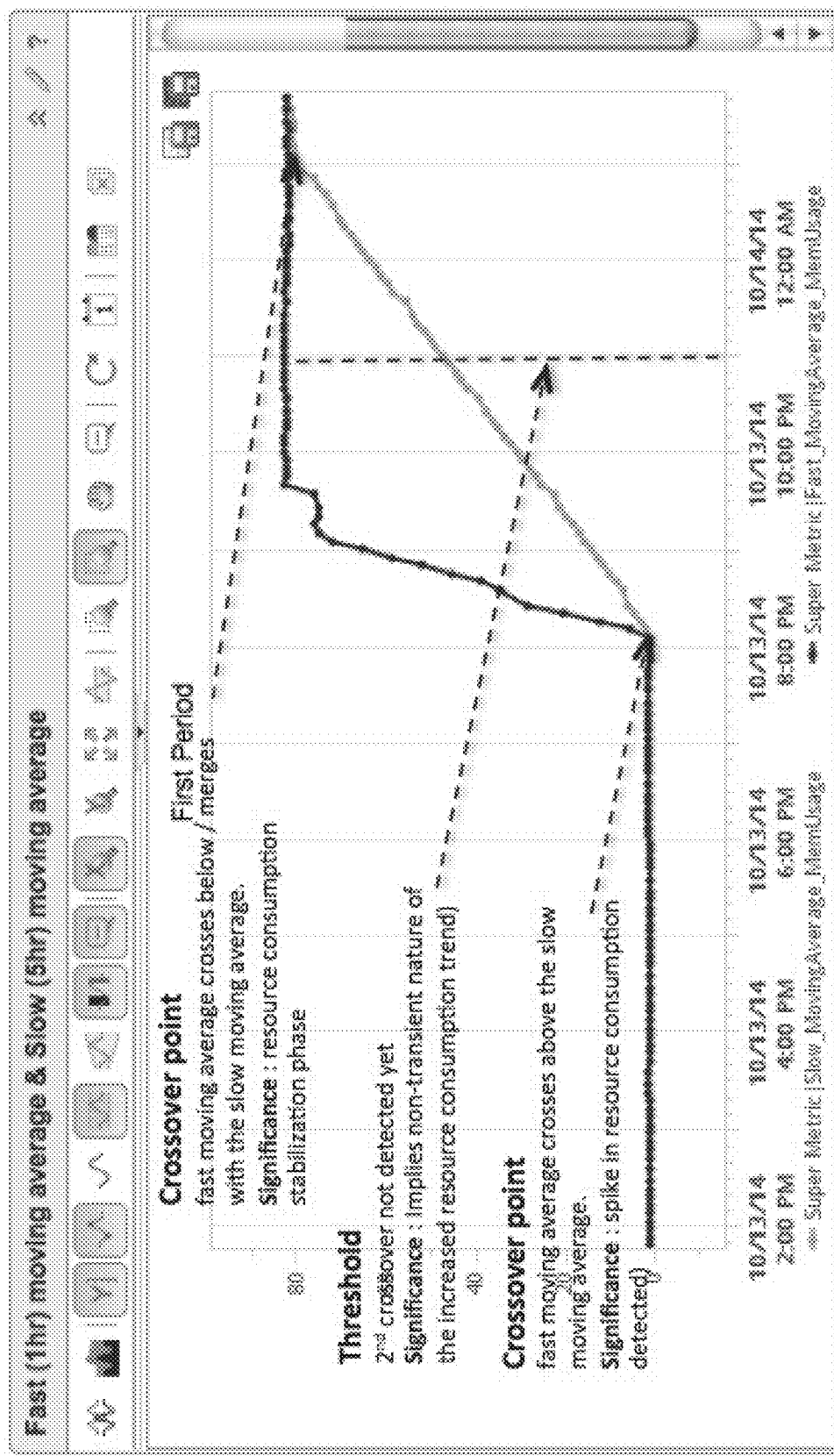
Fig. 2A1

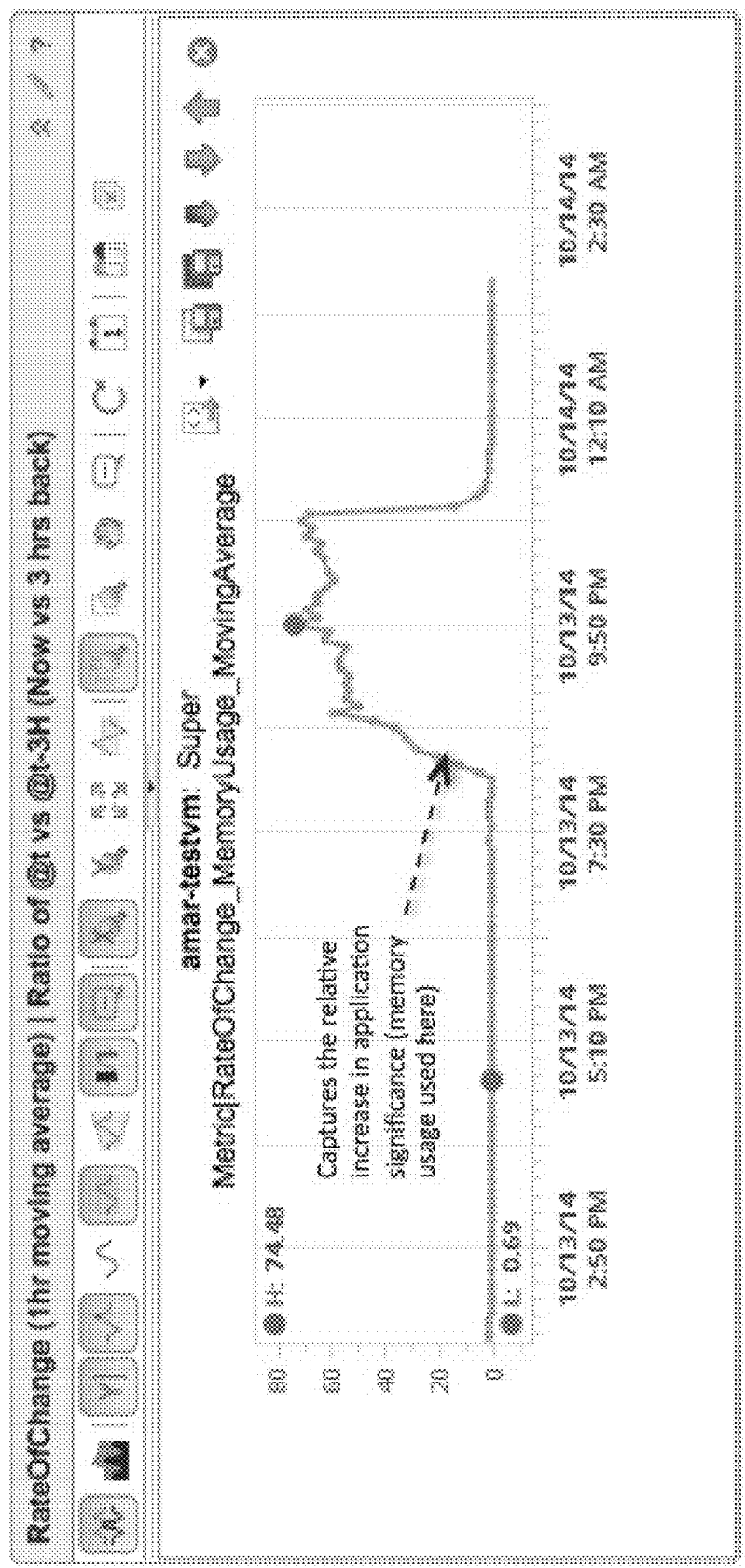
Fig. 2A2

DISASTER RECOVERY PROTECTION BASED ON RESOURCE CONSUMPTION PATTERNS

BACKGROUND

In large-scale virtualization environments comprising a system of virtual machines (VMs), such as in an enterprise for example, an IT organization in the enterprise might manage a datacenter that hosts and services applications that belong to multiple teams such as Finance, HR, Engineering etc. Typically provisioning a virtual application may be triggered by a requester who submits a request to an IT administrator. A virtual application may be a collection of VMs cooperating to provide computing resources to support the enterprise such as electronic mail services, database services, and the like. The request may include such as the list of servers that compose the application stack (e.g. Web server, Application server, DB server), OS images and versions required, resource or policy requirements in order to meet a certain level of service availability, and so on.

An important factor that may be considered during provisioning of a virtual application is whether the virtual application (and its constituent VMs) needs to be protected to ensure a desired level of availability in the event that a site becomes unavailable (e.g., due to power outage, system crash, degraded performance, etc.). The virtualization environment should be able to recover from such disasters in order to lessen the impact to the enterprise as much as possible. The practice of disaster recovery protection typically involves mirroring the data at the "primary site" to storage systems at a "recovery site." Disaster recovery protection may include providing backup of the physical infrastructure such as host machines in order to host the VMs that comprise the virtual application. Different levels of disaster recovery protection may be provided; e.g., backing up only the data, providing backup for less than all the VMs that comprise the virtual application, providing less than 100% of the processing bandwidth that the primary site provides, etc.

SUMMARY

Aspects of the present disclosure include a method in a system of virtual machines (VMs). The method may include designating a virtual application to be assessed for disaster recovery (DR) protection. The method may include accessing a resource consumption history for each constituent VM in the group of VMs that support the given virtual application. The resource consumption history may comprise a plurality of usage metrics corresponding to a plurality of resources used by each VM in the group of VMs. The method may further include producing one or more metrics indicative of a change in a cost of downtime of the given virtual application and assessing criteria (or rules) based on the resource consumption history of the VMs and the change in cost of downtime of the virtual application. The method may include designating the virtual application as a candidate for DR protection based on an assessment of the plurality of criteria and activating DR protection on one or more of the virtual applications designated as candidates for DR protection.

In some aspects, an index may be produced for the given virtual application based on the assessment of the criteria and selectively initiating DR protection for the given virtual application based on the index. The DR protection may automatically expire after a period of time.

In some aspects, the method may include displaying a list of the one or more virtual applications that are designated as candidates for DR protection in a user interface displayed on a display device. The list of virtual applications may be provided by sending a message to a user.

In some aspects, the usage metrics may include CPU usage, memory usage, data storage usage, network usage, and power usage. The data samples may be collected (e.g., by taking a snapshot) periodically. The data samples may be collected at predetermined instances during the lifetime of the VMs in the group of VMs that support the given virtual application; e.g., at an initial deployment of the group of VMs, at deployment of the group of VMs to a test environment, at deployment of the group of VMs from the test environment to a production environment, and the like.

Aspects of the present disclosure may include a non-transitory computer-readable storage medium containing executable instructions, which when executed by a computer, can cause the computer to designate a virtual application to be assessed for disaster recovery (DR) protection, access a resource consumption history for each constituent VM in the group of VMs that support the given virtual application. The resource consumption history may include a plurality of usage metrics corresponding to resources used by each VM. The executable instructions may further cause the computer to produce one or more metrics that indicate a change in a cost of downtime of the given virtual application and assess criteria (rules) based on the resource consumption history of the VMs and the cost of downtime of the virtual application. The computer may designate the given virtual application as a candidate for DR protection based on an assessment of the criteria, and activate DR protection on one or more of the virtual applications designated as candidates for DR protection.

In some aspects, the computer may produce an index for the given virtual application based on the assessment of the criteria and selectively initiate DR protection for the given virtual application based on the index. The DR protection may automatically expire after a period of time.

Aspects of the present disclosure may include an apparatus comprising one or more computer processors and a computer-readable storage medium having executable instructions, which when executed by the one or more computer processors, cause the one or more computer processors to designate a virtual application to be assessed for disaster recovery (DR) protection, access a resource consumption history for each constituent VM in the group of VMs that support the given virtual application. The resource consumption history may include a plurality of usage metrics corresponding to resources used by each VM. The executable instructions may further cause the computer to produce one or more metrics that indicate a change in a cost of downtime of the given virtual application and assess criteria (rules) based on the resource consumption history of the VMs and the cost of downtime of the virtual application. The computer may designate the given virtual application as a candidate for DR protection based on an assessment of the criteria. The computer may further activate DR protection on one or more of the virtual applications designated as candidates for DR protection. The DR protection may automatically expire after a period of time.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 2A1 and 2A2 illustrate examples of analytics in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
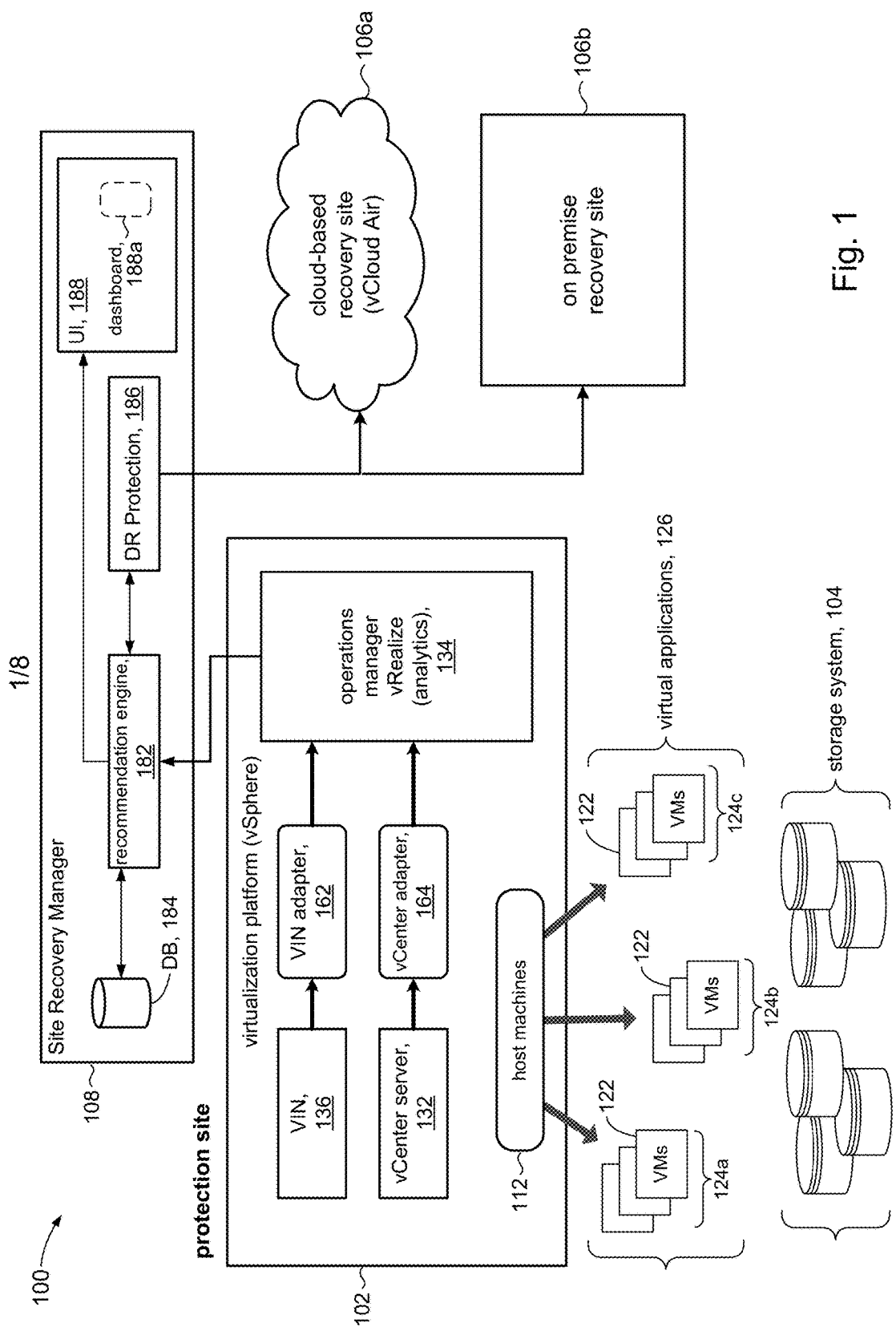
FIG. 1 shows a high level view of a virtualization environment in accordance with the present disclosure.

FIG. 1 shows a high level block diagram of a virtualization environment 100 in accordance with the present disclosure. The virtualization environment 100 may include a virtualization platform 102. An example of a commercially available virtualization platform 102 is the VMware vSphere® platform. FIG. 1 shows one instance of virtualization platform 102. In some embodiments, the virtualization environment 100 may comprise multiple instances of virtualization platforms 102 deployed, for example, at different locations in a building, at different geographical locations, etc. The description will assume without loss of generality a single virtualization platform 102 as shown in the figure.

The virtualization platform 102 may include underlying hardware that includes host machines 112 configured to host virtual machines (VMs, 122). Each of the host machines 112 may host several VMs 122. The host machines 112 may be interconnected by a communication network (not shown), allowing for networking of VMs 122 that are provisioned across different host machines 112. A storage system 104 may provide storage for the VMs 122. The storage system 104 may be any suitable storage architecture that can support the storage and storage access requirements of the VMs 122, such as block-based storage, network attached storage, and so on.

In some embodiments, the VMs 122 may be provisioned as independent machines, for individual users. In other embodiments, the VMs 122 may be organized into groups of VMs 124a, 124b, 124c to support virtual applications 126. A virtual application 126 may be implemented on a group (e.g., 124a) of interdependent VMs 122 that cooperate to support the virtual application 126. Merely as examples, virtual applications 126 may include mail servers (e.g., Microsoft® Outlook), database servers, web servers, etc. A virtual application may comprise several applications; e.g., a three tier application that contains an application server, database server and a web server, and so on.

The virtualization platform 102 may include various management modules to support the design, configuration, and deployment of VMs 122 and virtual applications 126 in the virtualization environment 100. For example, the virtualization platform 102 may include a management server 132 (e.g., VMware vCenter® server) to provide tools for managing VMs 122 across several host machines 112 at once.

The virtualization platform 102 may include a discovery module 136 configured to provide dependency mapping of the virtual applications 126. The discovery module 136 can monitor and manage the virtual infrastructure inventory objects and actions. For example, the discovery module 136 can track and monitor the host machines 112, the VMs 122 deployed on each of the host machines 112, the deployed virtual applications 126, the groups of virtual machines 124a, 124b, 124c that support the virtual applications 126, and so on. An example of discovery module 136 is the VMware vRealize® Infrastructure Navigator®.

The virtualization environment 100 may include an operations manager 134 to provide performance, capacity, and configuration management of the virtualization infrastructure defined in the virtualization platform 102. The operations manager 134 can track the movement of VMs 122 across different host machines 112 and changes in connectivity to the storage system 104 as the virtualization environment 100 expands and contracts over time. The operations manager 134 can also provide visibility at various layers in the stack, from the storage system 104 to the host machines 112 to the virtual applications 126. An example of the operations manager 134 is the VMware vRealize® Operations Manager.

The operations manager 134 may include an inventory interface 162 to collect relevant data about the virtual applications 126; e.g., application type (mail server, database server, etc.), the group of virtual machines (e.g., 124a) that support the virtual application 126, and other metadata. In a specific embodiment, for example, the inventory interface 162 may be an interface in the VMware vRealize® Operations Manager called the VIN adapter.

A management interface 164 may interface with the management server 132 to collect information (e.g., by taking a snapshot) of the objects (e.g., host machines, network interfaces, storage interfaces, etc.) managed by the management server 132. The information collected by the management interface 164 may include metrics of resources consumed by the group of virtual machines that support the virtual applications 126, referred to herein as usage metrics or resource consumption metrics. The management interface 164 maybe configured to collect data samples of resource usage by the virtual machines on a periodic basis (e.g., hourly, daily, weekly, etc.), on-demand by a user (e.g., administrator), etc. In accordance with the present disclosure, the management interface 164 may generate various computed values (e.g., averages, trends, and other analytics) from the collected usage metrics. The management interface 164 may collect data samples over the lifetime of each virtual machine. In a specific embodiment, the management interface 164 may be an interface in the VMware vRealize® Operations Manager called the vCenter adapter.

The virtualization environment 100 may include a site recovery manager 108 to manage failover of VMs 122 in the virtualization platform 102 to a recovery site. The site recovery manager 108 may include a DR Protection component 186 to manage a list (e.g., in database 184) of VMs 122 that are "protected" or otherwise identified for failover protection. For example, when a failure is determined to have occurred in a protected virtual machine, the DR Protection component 186 can take action to failover that virtual machine at a recovery site (e.g., bring the virtual machine up on another host machine at the recovery site). In some embodiments, the recovery site may be other host machines 112 in the virtualization platform 102 (e.g., an on premise recovery site 106*b*). In other embodiments, the recovery site may be an installation at a location different from that of the virtualization platform 102. For example, the recovery site may be a cloud-based recovery site 106*a*; e.g., the VMware vCloud Air® cloud computing platform may be used to support a recovery site.

In some embodiments, the DR Protection component 186 may be configured to protecting one or more VMs 122 using a recovery site. The unit of protection may be referred to as a "protection group." A protection group may be defined as a collection of VMs 122. The collection of VMs 122 that constitute a protection group may depend on inter VM relationships such as VM locality in the datacenter (virtual machine disk files that are part of the same datastore group), VMs 122 that are part of a virtual application (e.g., 124*a*). It may be preferable, though not necessary, that the VMs 122 that constitute a virtual application (e.g., 124*a*) be part of the same protection group in order to have seamless protection. In general, however, a protection group definition may be based on any suitable features that can aide in recovering the set of VMs 122 as one unit in the event of a disaster.

Initiating or activating DR protection on a set of VMs 122 may require more than just having the list of VMs 122 to be protected. For example, parameters such as RPO (recovery point objective measured in minutes), target location in the recovery site, VM provisioning features, and the like can be specified. In accordance with the present disclosure, suitable pre-configured defaults during protection initiation may be used. If the administrator decides to enable permanent DR protection beyond the protection expiration time the protection group configuration could be modified to suit the business needs.

In some embodiments in accordance with the present disclosure, the site recovery manager 108 may include a recommendation engine 182. The recommendation engine 182 may serve as a backend server component that retrieves data from different data providers and runs rules (criteria) to identify virtual applications as candidates for disaster recovery (DR) protection. For example, the recommendation engine 182 may query the operations manager 134 to identify deployed virtual applications 126 and to obtain metadata such as application type, constituent VMs 122, and so on. The recommendation engine 182 may query the DR Protection component 186 to obtain basic usage metrics and computed metrics. The rules and history of recommendations may be stored in database 184 for retrieval by the recommendation engine 182.

Access to the recommendation engine 182 may be gained via a recovery management user interface (UI) 188 that a user (e.g., system administrator) may use to manage recovery efforts in the virtualization environment 100 when one or more VMs 122 become disabled, non-functional, or otherwise perform below predetermined performance criteria. In accordance with the present disclosure, the recovery management UI 188 may include a recommendation dashboard 188*a* to provide disaster recovery management tools for the user. This aspect of the present disclosure will be described in more detail below.

In some embodiments, the recommendation engine 182 may generate and provide recommendations for DR protection to the user. For example, the recovery management UI 188 may obtain data (either pushed or pulled) from the recommendation engine 182 via suitable application program interface (API) calls and present the data via the recommendation dashboard 188*a*. In other embodiments, the data may be advertised (e.g., by the recovery management UI 188 or the recommendation engine 182) to a user via a suitable messaging service; e.g., an email message. In some embodiments, the recommendation engine 182 may persist recommendations for DR protection in database 184 used by the site recovery manager 108.

Recommendation Engine, 182

Figure 2:
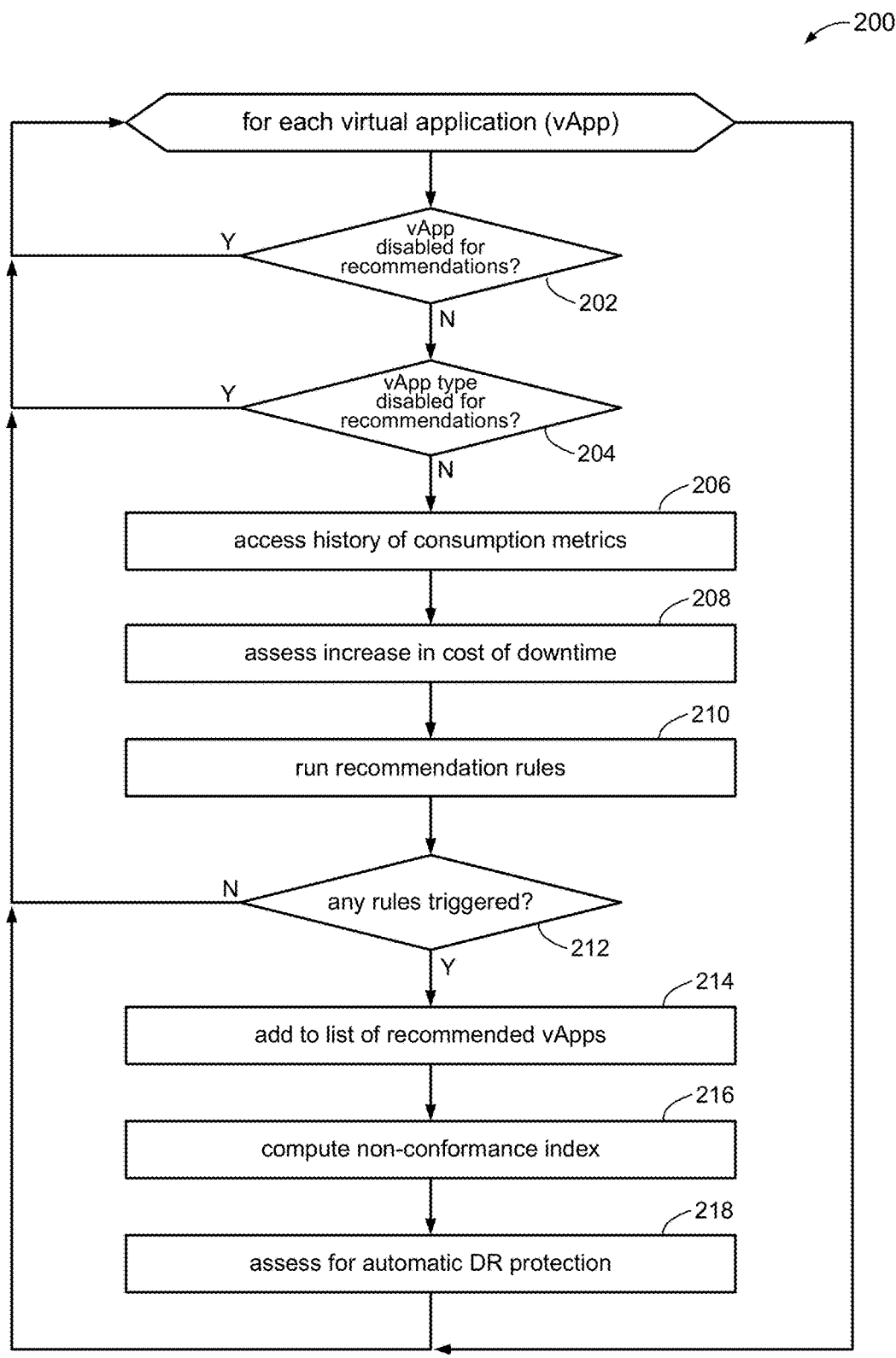
FIG. 2 shows processing in accordance with the present disclosure.

Referring to FIG. 2, the discussion will now turn to a description of details of the recommendation engine 182 in accordance with aspects of the present disclosure. As noted above, the recommendation engine 182 may be a component that runs inside the context the site recovery manager 108. The recommendation engine 182 may track state changes of a virtual application 126 based on inputs from various data sources such as the inventory interface 162, the management interface 164, etc.

FIG. 2 shows a high level decision tree 200 used to assess virtual applications 126 for DR protection in accordance with some embodiments. In some embodiments, each virtual application 126 may be assessed according to the decision tree 200. For example, the operations manager 134 may provide information about each deployed virtual application 126 as published by the VIN adapter 162.

In some embodiments, certain virtual applications may not be needed for DR protection and so their assessment for DR protection can be skipped. Whether or not a virtual application is disabled for DR assessment can be made based on policies of the enterprise. A decision maker within the enterprise (e.g., the business owner) may decide on a case-by-case basis not to DR protect the given virtual application (e.g., for cost reasons), and so on. Accordingly, for example, if at block 202 a given virtual application is marked or otherwise identified as being disabled for DR recommendations, then the recommendation engine 182 may skip that virtual application and process the next virtual application.

In accordance with some embodiments, certain types of virtual applications may be omitted from being assessed for DR protection. For example, utility type applications (e.g., a print server) may not warrant the expense of DR protection, and so may be omitted from being assessed for DR recommendations. Accordingly, if at block 202 the given virtual application is not explicitly disabled for DR recommendations, then a further inquiry may be made at block 204 to determine if that virtual application is of a type that is disabled for DR recommendations. If the application type of the given virtual application is disabled for DR recommendations, then the recommendation engine 182 may skip that virtual application and process the next virtual application.

If the application type of the given virtual application is not disabled for DR recommendation, then processing in the recommendation engine 182 may continue from block 204 to assess the given virtual application for disaster recovery (DR) protection. In some embodiments, for example, the recommendation engine 182 may determine if there is a change the "cost of downtime" for that virtual application, and in particular if the cost of downtime for that virtual application has increased. Cost of downtime may refer to the impact a virtual application has on the enterprise. For example, an email server that crashes may have significant impact on the enterprise; for example, a corporate-level email server that goes down can significantly affect corporate-level decision making. A customer relationship management (CRM) system that goes down may significantly affect customer support efforts. A medical records server in a hospital facility that crashes can seriously affect the delivery of health care, and so on. Accordingly, in accordance with the present disclosure, a virtual application may be qualitatively assessed to make an inference as to its cost of downtime and that its cost of downtime has increased.

In embodiments according to the present disclosure, at block 206 the recommendation engine 182 may access or otherwise gather together usage metrics collected for the group of virtual machines (e.g., 124*a*) that support the given virtual application. In accordance with embodiment of the present disclosure, the recommendation engine 182 may collect the following usage metrics for the given virtual application. As explained above, for example, the list of deployed virtual applications 126 and the constituent group of virtual machines (e.g., 124*a*) for each virtual application may be obtained from the inventory interface 162.

An illustrative sampling of metrics includes to following. It will be appreciated that in other embodiments, additional and/or alternative metrics may be use:

CPU usage of the host machine 112 that hosts the given virtual machine 122—This may include a metric that indicates the average percentage of the host machine's CPU used by a given virtual machine. A unit of measurement may be MHz.

memory usage of the host machine 112 that hosts the given virtual machine 122—This may include a metric that indicates how much of the host machine's memory is used by a given virtual machine. A unit of measurement may be kilobytes (KB) or gigabytes (GB).

storage usage—This may include a metric that indicates the rate of storage use by a given virtual machine; e.g., in units of KB/sec (KBps). Another metric may be the average number of write or read operations per unit of time; e.g., KBps.

network usage—This metric measures the network bandwidth usage of each virtual machine; e.g., in units of kilobits/sec (Kbps). Another metric may be the average data transmission rate or data reception rate.

power consumption—This refers to the total power consumption of a given virtual machine; e.g., in units of watts.

summary usage metrics—The foregoing may be aggregated to the virtual application level, rather than measured on a per constituent virtual machine basis. In addition to machine level metrics, application level metrics may be measured/tracked, such as number of logins per unit of time; e.g., per second. The total number of logins per unit of time (e.g., per day) may be measured. The length of user sessions and various statistics (e.g., average, minimum, maximum, etc.) may be measured, and so on.

In some embodiments, it may not be desirable to treat each usage metric with equal weighting. Some usage metrics may be more important than others. For example, CPU usage metrics may be more significant than network usage metrics. Accordingly, in some embodiments, the relative importance of a usage metric may be expressed by a metric class weight. The foregoing list of usage metrics, for example, represents an example of metric classes, such as CPU usage metrics, memory usage metrics, and so on. As a default, each metric class may have a weighting of 1. In accordance with some embodiments, however, a user may configure the weight of each metric class.

Continuing with the decision tree of FIG. 2, at block 208 a resource consumption history may be analyzed to assess increase in cost of downtime in the given virtual application. In some embodiments, for example, an increase in cost of downtime may be assessed by tracking the various usage metrics to detect pattern of growth of the virtual application over time. Virtual applications utilize resources. Some virtual applications may be applications that experience a spike in resource consumption for short bursts of time. In contrast, other virtual applications may steadily increase in significance over time, which may be indicated by increased resource consumption patterns that tend to sustain at the new highs. Also, there may be virtual applications that go viral amongst consumers that show higher resource consumption trends in very short periods of time and tend to stabilize at a new high. Depending on the time range being used, the resource consumption pattern may follow a step function. In order to capture this pattern and turn them into actionable feedback to the administrator, some embodiments may leverage a moving average metric to track the virtual application's growth over time. The significance of tracking a virtual application's growth can be directly tied to mitigating the risk of the virtual application's downtime; e.g., as the virtual application grows in significance, its cost of downtime rises proportionally.

As an illustrative example, a fast vs. slow moving average may be used to detect growth of a virtual application. For example, the fast moving average and slow moving average may be computed for a usage metric for the given virtual application. For instance, the metric could be the memory consumption in KB of one or more of the virtual machines in the group of virtual machines that comprise and support the given virtual application. The number of login attempts may be used, and so on. When the fast moving average crosses above the slow moving average, this may serve to signal that the virtual application is displaying increase in the resource consumption patterns. If a second crossover has not taken place for N computation cycles, that may serve to indicate the increase in resource consumption pattern is non-transient in nature. It can take time for the slow moving average to catch up to the fast moving average if the given virtual application has stabilized its resource consumption in its new found high. The area between the two crossovers may serve to represent a window which can be used to detect such a pattern, which may directly correlate to the increased significance of the resource. FIG. 2A1 illustrates an example of such a comparison and its crossover.

As another illustrative example, a growth factor may be computed to quantify the growth of a virtual application. To better understand the rate at which the given virtual application experiences growth, a comparison against multiple recorded resource consumption snapshots might be employed. For example, the following comparisons may be used:

Compare most recent 1 week moving average against 1 week moving average of values at an initial deployment of the group of VMs.

Compare the most recent 1 week moving average against 1 week moving average of values at deployment of the group of VMs to a test environment.

Compare the most recent 1 week moving average against 1 week moving average of values at deployment of the group of VMs from the test environment to a production environment.

The time periods mentioned merely serve as examples. One of ordinary skill will appreciate that other periods of time may be used.

These comparisons can provide an estimate on how much the given virtual application has grown since the baseline. For instance, if the moving average of the number of unique login requests per day increased by a factor of 4 as compared to the last 6 months, this may imply that the virtual application has grown in significance by a factor of 4. Also based on this observation, cost of downtime may be deemed to have quadrupled in the last 6 months. An example is shown in FIG. 2A2.

Continuing with the decision tree of FIG. 2, at block 210 the recommendation engine 182 may run one or more rules or criteria to form a basis for deciding whether or not to recommend the given virtual application for DR protection. Inputs to the rules may include: aggregated (computed) metric data, raw metric data, increase in cost of downtime analysis (block 208), virtual application metadata (e.g., type, size of the group of virtual machines (e.g., 124a), and so on. In some embodiments, the recommendation engine 182 may include a general-purpose rule processing engine. Rules may be authored by the user (e.g., system administrator), and thus may be customized specifically for their organization.

As an example, a rule may be written to express the following criteria. If the given virtual application is of the type MAIL SERVER, then increases in the cost of downtime is expected to be less than 25% as compared to a snapshot of that virtual application taken at the time of deployment into production. It will be appreciated that the specific way to express the rule will depend on the rule engine employed. This rule will be fired if the cost of downtime of a mail server type of virtual application has increased by 25% or more as compared to when it was initially deployed into production.

Another example for a rule is: that a virtual application of the type SHAREPOINT™ SERVER and having a name that matches AdminSharePointServer cannot have an aggregated memory consumption (of all the constituent virtual machines) that is greater than 160 GB. This rule will be fired if the memory usage of all the virtual machines that support a SharePoint™ server type of virtual application named "AdminSharePointServer" exceeds 160 GB.

As another example, a rule may be written for a virtual application that is of the type DATABASE SERVER, where the increase in the cost of downtime is less than 10% as compared to a snapshot of that virtual application taken at most recent quarterly snapshot. A database server type of virtual application whose cost of downtime is greater than 10% as compared to its cost of downtime last quarter will fire this rule.

Continuing with the decision tree of FIG. 2, at block 212 if the given virtual application does not fire any of the rules, then processing may return to process the next virtual application. Otherwise, processing may proceed to block 214.

At block 214, the given virtual application may be added to a list of recommended virtual applications. In some embodiments, the list of recommended virtual application may be made available in a display; e.g., the recommendation dashboard 188a. The user (e.g., a system administrator) may access the recommendation dashboard 188a and view the list of recommended virtual applications that have been identified as candidates for DR protection. This aspect of the present disclosure will be explained in more detail below.

At block 216, in some embodiments, the recommendation engine 182 may compute a non-conformance index for the given virtual application. This may be an index that represents how much the given virtual application deviates from a predefined behavior (as set forth by the rules). A value of 0, for example, may indicate absolute conformance; in other words, none of the rules were fired. A non-conformance index value greater than 0 indicates some measure of non-conformance, since one or more of the rules were fired (and in this context violated). The greater the value of this index, the more non-conformant the given virtual application is according to the rules.

In some embodiments, the value of the non-conformance index may be depend on the rule or rules that were fired. For example, the non-conformance index may be simply the number of fired rules. In some embodiments, each rule may be associated with an index value. The non-conformance index may be assigned the highest index value among the fired rules. The non-conformance index may be the summation of index values of all the fired rules, and so on.

In accordance with the present disclosure, if a determination is made at block 212 that the given virtual application is a candidate for DR protection, then the recommendation engine 182 may initiate automatic DR protection of the given virtual application. Accordingly, at block 218, the list of recommended virtual applications may be assessed (FIG. 2B) for automatic DR protection. Processing may return to the top to process then next virtual application. In some embodiments, DR protection may be activated for one or more of the candidate virtual applications.

Figure 2B:
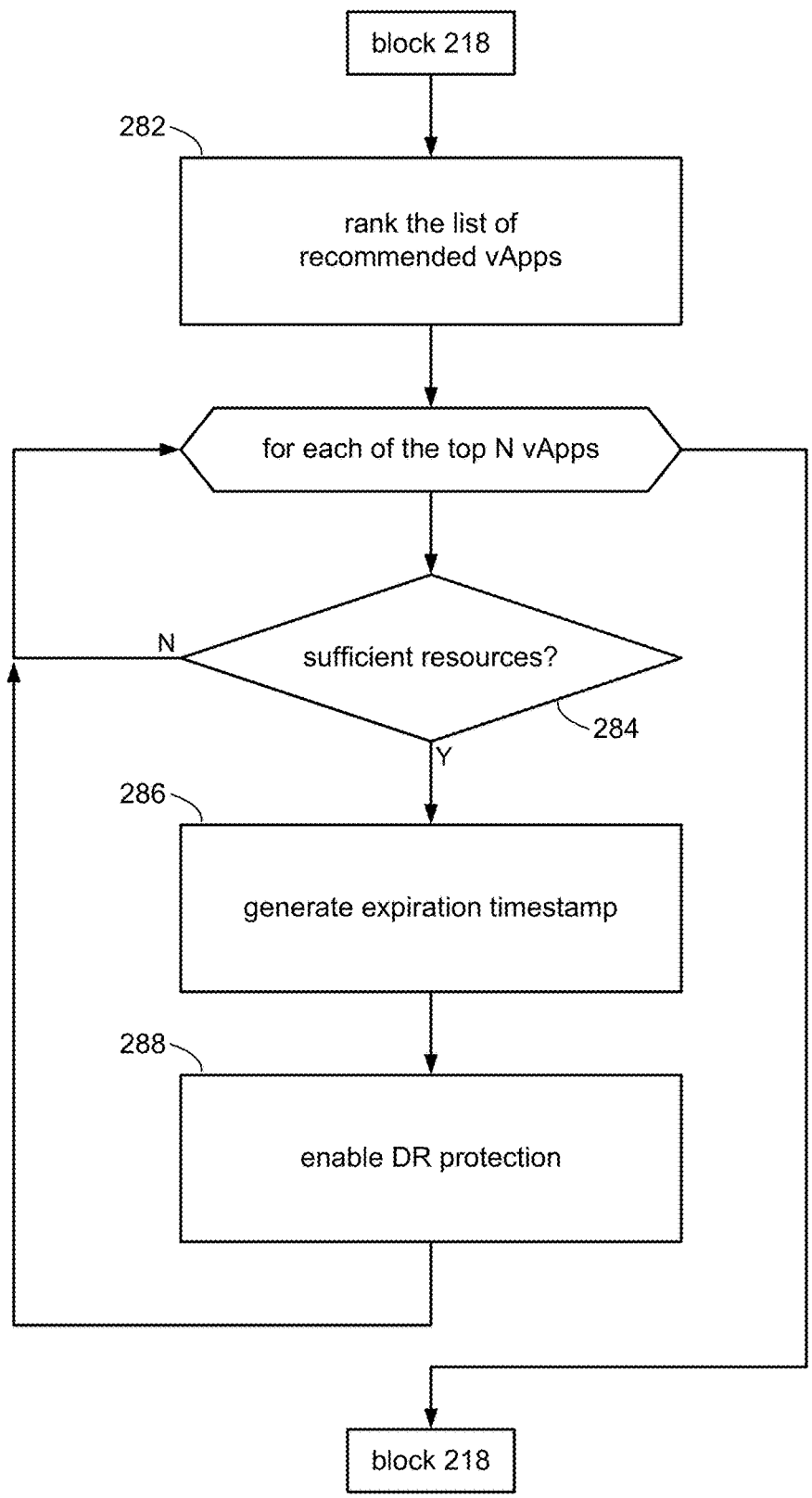
FIG. 2B shows additional processing in accordance with the present disclosure.

The discussion will turn to FIG. 2B for a process flow, in accordance with some embodiments, to assess the list of recommended virtual applications for automatic DR protection. At block 282, the recommendation engine 182 may rank the list of recommended virtual applications. In some embodiments, for example, the non-conformance index may be used to rank the virtual applications; e.g., from highest to lowest.

Each of the top N (e.g., 5) virtual applications in that list may then be considered for automatic DR protection. At block 284, the recommendation engine 182 may determine if there is a suitable recovery site that has sufficient resources (e.g., host machines, storage, etc.) to enable DR protection for a given virtual application. If the given virtual application cannot be enabled for DR protection, the next virtual application in the ranked list may be considered.

If a suitable recovery site exists, then at block 286 the recommendation engine 182 may generate an expiration timestamp for the given virtual application. The timestamp may be used to expire the DR protection for the given virtual application, since setting up DR protection can be expensive. For example, DR protection may be set up for one week, or a month, etc. Establishing temporary DR protection for the given virtual application may give the user (e.g., system administrator) some time to follow up with a decision maker (e.g., business owner) whether permanently enable DR protection, extend the temporary period, disable DR protection, remove the virtual application from future consideration, and so on.

At block 288 the recommendation engine 182 may configure the recovery site to provide DR protection of the given virtual application. The recovery site may use the expiration timestamp to expire DR protection for the given virtual application. In some embodiments, the recommendation engine 182 may additionally send a notification to one or more users to inform that DR protection has been set up for the give virtual application.

Recommendation Dashboard, 188a

Figure 3:
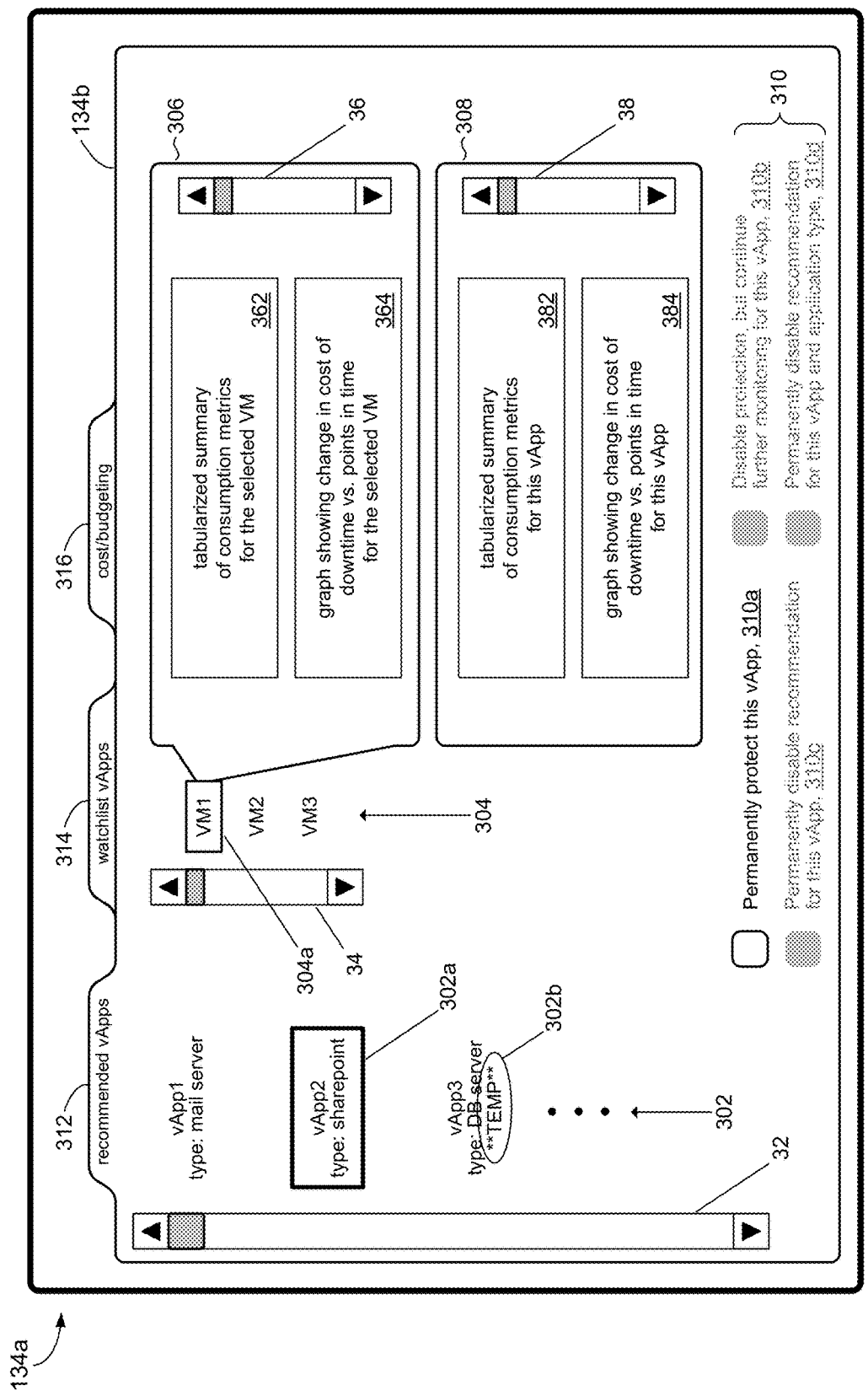
FIGS. 3 and 3A depict illustrative examples of recommendation dashboards in accordance with the present disclosure.

In some embodiments, the recommendations for DR protection may be presented in an administrative UI (e.g., recovery management UI 188) in the form of a dashboard (e.g., recommendation dashboard 188a) that allows the user, such as a system administrator, to interact with the DR Protection component 186 to invoke and otherwise manage DR protection for virtual applications recommended by the recommendation engine 182. Referring to FIG. 3, for example, in some embodiments, the recovery management UI 188 may comprise several tabs 312, 314, 316. A watch list tab 314 may provide a list of virtual applications that are not DR protected, but which the user may want to keep track of for future consideration. A budgeting tab 316 may allow the user to keep track of their budget for DR protected virtual applications, and so on.

In accordance with some embodiments, the recommendation dashboard 188a may be accessed from a recommendations tab 312. Each time the recommendation engine 182 identifies one or more candidates for DR protection, information that identifies those candidates may be communicated the recovery management UI 188. In some embodiments, recovery management UI 188 may access information stored in the virtualization platform 102 relating to those candidates to drive the recommendation dashboard 188a.

In some embodiments, for example, the recommendation dashboard 188a may include a list 302 of the candidate virtual applications identified by the recommendation engine 182. A scroll bar 32 can allow the user to scroll through the list 302 of recommended virtual applications. The user may select a recommended virtual application, for example, by "clicking" on it. FIG. 3 shows an example where the user has selected "vApp2," indicated by a box graphic 302a displayed around the text. Recall from the discussion above that the recommendation engine 182 may initiate temporary DR protection (block 216, FIG. 2) for a virtual application that has been identified as a candidate for DR protection. The list 302 of candidate virtual applications may be annotated to inform the user whether DR protection has been set up of a virtual application. Referring to FIG. 3, for example, vApp3 has been set up for temporary DR protection. In some embodiments, this may be indicated by the annotation 302b "TEMP" so that the virtual application vApp3 can stand out to the user. It will be appreciated that other visualizations may be employed to catch the user's attention.

The recommendation dashboard 188a may display a list 304 of the group of VMs (e.g., 124a, FIG. 1) that support the selected virtual application. For example, a scroll bar 34 can allow the user to scroll through the list 304 of VMs. The user may select a VM, for example, by clicking on it. FIG. 3 shows an example where the user has selected "VM1," indicated by a box graphic 304a displayed around the text.

The recommendation dashboard 188a may include a summary window 306 that summarizes the consumption metrics for the selected VM. In some embodiments, the summary window 306 may include a table 362 that summarizes the consumption metrics for the selected VM, for example:

| Metric | Observed | Threshold |
| --- | --- | --- |
| CPU | 80% | 50% |
| % of cluster CPU | 25% | 10% |
| etc. | etc. | etc. |

The summary window 306 may include a chart or other suitable graphical presentation 364 that illustrates changes in the cost of downtime contributed by the selected VM over a period of time. For example, cost of downtime vs. specific periods of time (user-specified sync points) may be charted; e.g., at initial deployment of the virtual application, when the virtual application moves into a test cluster, when the virtual application moves into production, at quarterly intervals while the virtual application is in production, and so on. Other charts may include a graph of a particular consumption metric (e.g., CPU usage, memory usage, etc.) charted over time. The time periods may be weekly, monthly, quarterly, etc. Some charts may provide comparisons of multiple consumption metrics. Charts may include statistical tools such as trend lines, moving averages, and so on. FIGS. 2A1 and 2A2 provide some illustrative examples of graphical representation 364. The summary window 306 may include a scroll bar 36 to allow the user to scroll through the summaries 362, 364.

The recommendation dashboard 188a may include a summary window 308 that summarizes consumption metrics of the selected virtual application itself. In some embodiments, the summary window 308 may include a tabularized summary 382 of consumption metrics that aggregates the consumption metrics of the individual VMs that support the selected virtual application. The summary window 308 may include a chart or other suitable graphical presentation 384 that illustrates the cost of downtime of the selected virtual application over a period of time. For example, cost of downtime vs. specific periods of time (sync points) may be charted. For example, the user may identify initial deployment of the virtual application as a sync point. When the virtual application moves into a test cluster may be another sync point, and so on. The summary window 306 may include a scroll bar 36 to allow the user to scroll through the summaries 382, 384.

The recommendation dashboard 188a may include an action area 310 that allows the user to take certain actions on the selected virtual application. For example, the user may permanently DR protect 310a the selected virtual application. In response to this action, the recommendation dashboard 132b may send the user to another UI (not shown) to set up the selected virtual application for DR protection. This may involve establishing data mirroring at a replication site, defining backup for all or some of the group of VMs that support the selected virtual application, defining backup for host machines to host all or some of the group of VMs that support the selected virtual application, and so on.

Actions 310b, 310c, 310d in the action area 310 may be used for virtual applications that have been set up for temporary DR protection. The example in FIG. 3, shows vApp2 to be the selected virtual application, which has not been set up for DR protection, but is only recommended for DR protection. Accordingly, the actions 310b, 310c, 310d may be disabled (e.g., grayed out), since those actions may be applicable to vApp2.

Figure 3A:
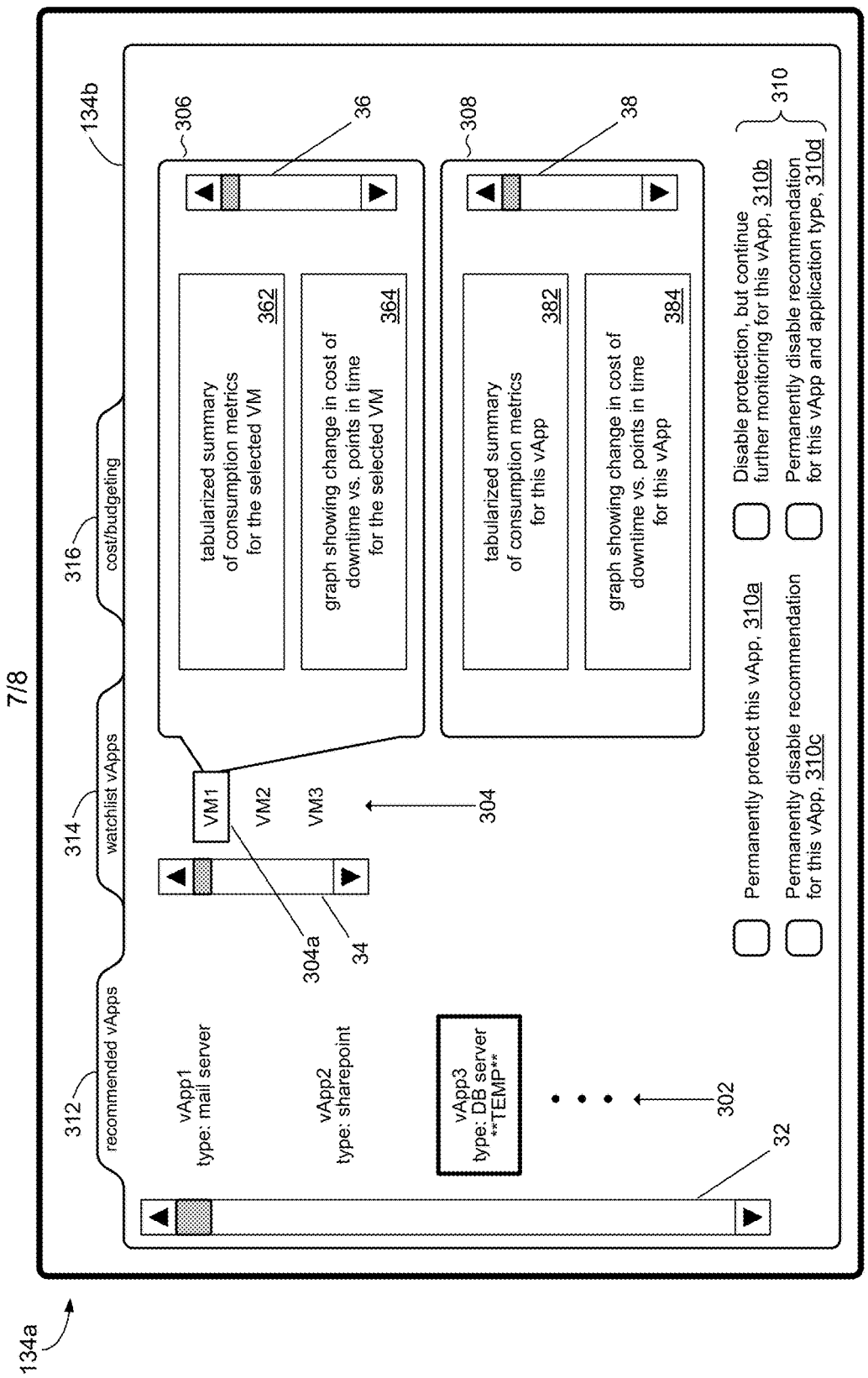

Referring to FIG. 3A, the example depicted in the figure shows vApp3 to be the selected virtual application. The example further depicts vApp3 as having been set up for temporary DR protection. Accordingly, the actions 310b, 310c, 310d may be enabled for selection by the user. Action 310b, for example, allows the user to override the set up of temporary DR protection for the selected virtual application. However, monitoring of that virtual application by the recommendation engine 182 may continue. Action 310c allows the user to disable the temporary DR protection that was set up for the selected virtual application and remove that virtual application from further monitoring by the recommendation engine 182. Action 310d allows the user to disable the temporary DR protection that was set up for the selected virtual application, and to remove it and other virtual applications of the same type from further monitoring by the recommendation engine 182. It will be appreciated that the action area 310 may include additional suitable actions.

Figure 4:
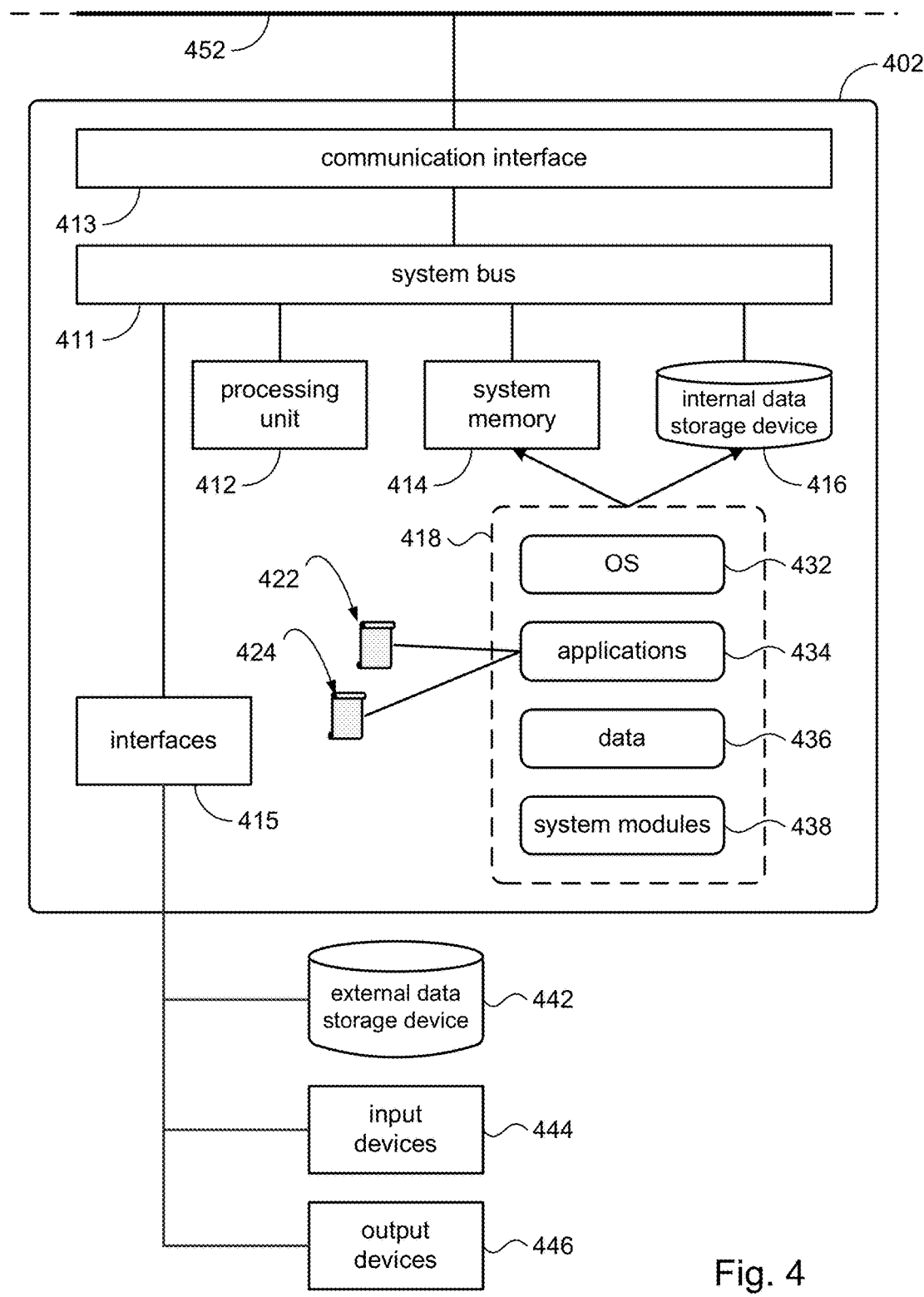
FIG. 4 depicts an example of a computer system as used in accordance with various embodiments of the present disclosure.

Referring to FIG. 4, the foregoing may be implemented on a computer system 402; e.g., host machines 112, management server 1232, recommendation engine 182, recovery management UI 188 etc. The computer system 402 may include a processing unit 412, a system memory 414, and a system bus 411. The system bus 411 may connect various system components including, but not limited to the processing unit 412, the system memory 414, an internal data storage device 416, and a communication interface 413. The various embodiments described herein may be practiced with other computer system configurations including handheld devices, microprocessor systems, microprocessor-based or programmable consumer electronics, minicomputers, mainframe computers, and the like.

The processing unit 412 may comprise a single-processor configuration, or may be a multi-processor architecture. The system memory 414 may include read-only memory (ROM) and random access memory (RAM). The internal data storage device 416 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 402 is a mobile device, the internal data storage 416 may be a flash drive.

The internal data storage device 416 and its associated non-transitory computer-readable storage media provide nonvolatile storage of data, data structures, computer-executable instructions, and so forth. Although the description of computer-readable media above refers to an HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 414 and/or the internal data storage device 416 may store a number of program modules, including an operating system 432, one or more application programs 434, program data 436, and other program/system modules 438. For example, the application programs 434, which when executed, may cause the computer system 402 to perform method steps of FIG. 2 in a recommendation engine 182. The application programs 434 may provide the recommendation dashboard 132b, and so on.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

As noted above, one or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

An external data storage device 442 may be connected to the computer system 402. For example, the external data storage device 442 may store the inventory for the operations manager 134. The external data storage device 442 may be the database 184 in the site recovery manager 108, and so on.

Access to the computer system 402 may be provided by a suitable input device 444 (e.g., keyboard, mouse, touch pad, etc.) and a suitable output device 446, (e.g., display screen). In a configuration where the computer system 402 is a mobile device, input and output may be provided by a touch sensitive display.

The computer system 402 may operate in a networked environment using logical connections via wired and/or wireless communications to one or more remote computers (not shown) over a communication network 452. The communication network 452 may be a local area network (LAN) and/or larger networks, such as a wide area network (WAN).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a system of virtual machines (VMs) comprising:
   selecting only a subset of virtual applications that warrant assessment for disaster recovery (DR) protection from among a plurality of virtual applications executing in a virtualization environment comprising the system of VMs, each virtual application in the subset of virtual applications supported by a group of VMs in the virtualization environment; and
   assessing each virtual application in the subset of virtual applications for disaster recovery (DR) protection, including for a given virtual application in the subset of virtual applications:
      detecting a pattern of growth in the given virtual application; and
      activating DR protection for the given virtual application in response to detecting a pattern of growth in the given virtual application,
      wherein detecting a pattern of growth in the given virtual application includes:
         accessing a resource consumption history for each constituent VM in the group of VMs that support the given virtual application, the resource consumption history comprising a plurality of usage metrics corresponding to a plurality of resources used by each VM in the group of VMs, each usage metric comprising a plurality of data samples representative of usage levels of a resource corresponding to the usage metric;
         triggering one or more rules among a plurality of rules by applying the plurality of usage metrics to the plurality of rules; and
         determining an index for the given virtual application by making one or more numeric computations on numerical values associated with triggered rules or on the number of rules triggered,
      wherein activating DR protection for the given virtual application is based on the index.

2. The method of claim 1, further comprising configuring DR protection on the given virtual application to automatically expire after a period of time.

3. The method of claim 1, wherein the plurality of usage metrics is indicative of one or more of CPU usage, memory usage, data storage usage, network usage, and power usage.

4. The method of claim 1, wherein the data samples are collected periodically.

5. The method of claim 1, wherein the data samples are collected at predetermined instances during a deployment lifetime of the VMs in the group of VMs that support the given virtual application.

6. The method of claim 5, wherein the predetermined instances include one or more of an initial deployment of the group of VMs, deployment of the group of VMs to a test environment, and deployment of the group of VMs from the test environment to a production environment.

7. The method of claim 1, further comprising designating the given virtual application as a candidate for DR protection based on the assessment of the plurality of criteria; and providing information to one or more users that identifies the given virtual application as a candidate for DR protection.

8. The method of claim 7, wherein providing information to one or more users includes displaying a list of the one or more virtual applications, which includes the given virtual application, that are designated as candidates for DR protection in a user interface displayed on a display device.

9. The method of claim 7, wherein providing information to one or more users includes sending a message to a user.

10. A non-transitory computer-readable storage medium containing executable instructions, which when executed by a computer, cause the computer to:
   select only a subset of virtual applications that warrant assessment for disaster recovery (DR) protection from among a plurality of virtual applications executing in a virtualization environment comprising the system of VMs, each virtual application in the subset of virtual applications supported by a group of VMs in the virtualization environment; and
   assess each virtual application in the subset of virtual applications for disaster recovery (DR) protection, including for a given virtual application in the subset of virtual applications;
   detect a pattern of growth in the given virtual application; and
   activate DR protection for the given virtual application in response to detecting a pattern of growth in the given virtual application, including:
      accessing a resource consumption history for each constituent VM in the group of VMs that support the given virtual application, the resource consumption history comprising a plurality of usage metrics corresponding to a plurality of resources used by each VM in the group of VMs, each usage metric comprising a plurality of data samples representative of usage levels of a resource corresponding to the usage metric;

triggering one or more rules among a plurality of rules by applying the plurality of usage metrics to the plurality of rules;

determining the index for the given virtual application by making one or more numerical values associated with triggered rules or on the number of rules triggered; and activating DR protection for the given virtual application based on the index.

11. The non-transitory computer-readable storage medium of claim 10, wherein the DR protection automatically expires after a period of time.

12. The non-transitory computer-readable storage medium of claim 11, further comprising executable instructions, which when executed by the computer, cause the computer to produce an index for the given virtual application based on the assessment of the plurality of criteria, wherein DR protection is selectively activated for the given virtual application based on the index.

13. The non-transitory computer-readable storage medium of claim 10, wherein the plurality of usage metrics is indicative of one or more of CPU usage, memory usage, data storage usage, network usage, and power usage.

14. The non-transitory computer-readable storage medium of claim 10, wherein the data samples are collected periodically.

15. The non-transitory computer-readable storage medium of claim 10, wherein the data samples are collected at predetermined instances during a deployment lifetime of the VMs in the group of VMs that support the given virtual application.

16. The non-transitory computer-readable storage medium of claim 15, wherein the predetermined instances include one or more of an initial deployment of the group of VMs, deployment of the group of VMs to a test environment, and deployment of the group of VMs from the test environment to a production environment.

17. The non-transitory computer-readable storage medium of claim 11, further comprising executable instructions, which when executed by the computer, cause the computer to provide information to one or more users that identifies one or more virtual applications which are designated as candidates for DR protection, including the given virtual application.

18. An apparatus comprising:
one or more computer processors; and
a computer-readable storage medium comprising executable instructions, which when executed by the one or more computer processors, cause the one or more computer processors to:

select only a subset of virtual applications that warrant assessment for disaster recovery (DR) protection from among a plurality of virtual applications executing in a virtualization environment comprising the system of VMs, each virtual application in the subset of virtual applications supported by a group of VMs in the virtualization environment; and assess each virtual application in the subset of virtual applications for disaster recovery (DR) protection, including for a given virtual application in the subset of virtual applications:

detect a pattern of growth in the given virtual application; and activate DR protection for the given virtual application in response to detecting a pattern of growth in the given virtual application, including:

accessing a resource consumption history for each constituent VM in the group of VMs that support the given virtual application, the resource consumption history comprising a plurality of usage metrics corresponding to a plurality of resources used by each VM in the group of VMs, each usage metric comprising a plurality of data samples representative of usage levels of a resource corresponding to the usage metric;

triggering one or more rules among a plurality of rules by applying the plurality of usage metrics to the plurality of rules;

determining an index for the given virtual application by making one or more numeric computations on numerical values associated with triggered rules or on the number of rules triggered; and activating DR protection for the given virtual application based on the index.

19. The apparatus of claim 18, wherein the DR protection automatically expires after a period of time.

* * * * *